United States Patent [19]

Garvin et al.

[11] 4,289,381

[45] Sep. 15, 1981

[54] HIGH SELECTIVITY THIN FILM POLARIZER

[75] Inventors: Hugh L. Garvin, Malibu; Douglas A. Pinnow, Pacific Palisades, both of Calif.

[73] Assignee: Hughes Aircraft Company, Culver City, Calif.

[21] Appl. No.: 54,361

[22] Filed: Jul. 2, 1979

[51] Int. Cl.³ .......................... G02B 5/30; B05D 3/00
[52] U.S. Cl. .................................. 350/320; 156/643; 219/121 EK; 219/121 LJ; 350/370; 350/395; 427/38; 427/43.1; 427/163
[58] Field of Search ............ 350/147, 152, 395, 320; 343/909; 219/121LJ, 121 EK; 427/38, 43.1, 163; 156/643

[56] References Cited

U.S. PATENT DOCUMENTS 3,271,771  9/1966  Hannan et al. ................. 343/909

OTHER PUBLICATIONS

Auton, J. P., "Infrared Transmission Polarizers by Photolithography", App. Optics, 6-1967, pp. 1023-1027.

Harvey, A. F., "Coherent Light", Wiley Interscience, 19 0, pp. 227-234.

*Primary Examiner*—William H. Punter
*Attorney, Agent, or Firm*—Robert M. Wallace; William H. MacAllister

[57] ABSTRACT

A thin film polarizer for dividing electromagnetic energy into two mutually orthogonal components with a high degree of selectivity. A plurality of wire grids having an interelement spacing of less than one wavelength is supported by a substrate of electrically insulative material. The substrate is invisible to the wavelength of the polarized electromagnetic energy. The planar wire grids are substantially parallel and spaced less than one wavelength therebetween to achieve an efficient and compact thin film polarizer. The process of this invention for forming the plurality of wire grids comprises photolithographically defining each grid layer by the interference pattern of at least two coherent beams such as laser beams, one forming step being required for each grid, an anti-reflective layer being inserted between adjacent grid layers.

4 Claims, 9 Drawing Figures

HIGH SELECTIVITY THIN FILM POLARIZER

TECHNICAL FIELD

The present invention relates to means for polarizing electromagnetic radiation and in particular to thin film devices which may be employed to achieve a very high extinction ratio.

BACKGROUND ART

Thin film optical and quasi-optical devices, which feature small energy absorption and minimal incidental signal interaction within a predetermined bandwidth, have acquired a growing utility in significant emerging technologies. (See, for example, Yariv, "Guided-Wave Optics", *Scientific American* (January 1979) pp. 64–72.) Thin film polarizers, for example, are useful in, inter alia, ellipsometry (the measurement of optical properties of materials, medical diagnostic instruments and laser communications systems such as the $CO_2$ communication system diplexer. The polarization of radiation, an essential function within a large variety of electromagnetic systems, increases the ability of the above-named systems to transmit and detect useful information.

A popular polarizer presently used in the spectral range of 10–200 microns consists of a pile-of-plates inclined at the Brewster angle. The material of the plates depends upon its transmission at the wavelength of interest. Selenium, silicon and polyethylene have served as plate materials for wavelengths of common interest. The pile-of-plates does not form a thin film element. Rather, it comprises a relatively bulky device, limited functionally to parallel beams and a relatively narrow acceptance angle. An improvement over the pile-of-plates is obtained by the use of the well-known wire grid polarizer. Since before 1900 it has been known that a naked grid of parallel wires reflects one polarization of incident radiation while transmitting the other, provided that the wavelength of the incident radiation is larger than the period of the grid. Newly developed techniques have overcome the structural inadequacies inherent in a grid of unsupported wires. The work of G. R. Bird and M. Parrish ("The Wire Grid as a Near-Infrared Polarizer", J. Opt. Soc. Am., Vol. 50, pp. 886–891) demonstrated the construction of a wire grid polarizer supported by a plastic substrate in 1960. M. Hass and M. O'Hara described IR polarizers prepared on substrates of polymethylmethacrylate and polyethylene plastics in 1965 ("Sheet Infrared Transmission Polarizer", Appl. Opt., Vol. 4, pp. 1027–1031). More recently, fabrication techniques applicable to the thin film wire grid polarizer were disclosed in U.S. Pat. No. 4,049,944 granted to Garvin, Yariv and Somekh for "Process for Fabricating Small Geometry Semiconductive Devices Including Integrated Components". The above-referenced patent is the property of the assignee herein.

It is known that the extinction ratio (polarization selectivity) of the wire grid polarizer is proportional to (i) the ratio of the wavelength of incident radiation to the spacing (period) of the wires of the grid and (ii) the ratio of the width of the grid elements to their period. Extinction ratios of about 500:1 can be achieved by the wire grid polarizer fabricated within the bounds of state-of-the art technology. (See above-referenced patent to Garvin, et al.) This ratio does not represent sufficient polarization purity for a variety of electro-optical filter applications and many of the uses described above. Practical limitations to the extent of polarization achievable with the wire grid polarizer arise from the difficulty of maintaining electrical isolation between individual grid members as their spacing (period) is decreased. The shorting of the wires reduces the transparency of the grid to the incoming radiation, introducing (or augmenting) the undesired reflection of the electric field vector component perpendicular to the lengths of the wires of the grid. The extinction ratio, defined as the ratio of the amount of energy reflected by the grid with elements (wires) aligned parallel to the direction of polarization of incident radiation to the amount of energy reflected by the grid with elements aligned perpendicular to the direction of polarization is thereby reduced and limited by the incompatability of state-of-the-art manufacturing processes with the above-referenced theory of the wire grid which dictates a continual decrease in element spacing relative to element width to increase the extinction ratio.

SUMMARY OF THE INVENTION

It is therefore an object of the present invention to achieve a polarization selectivity greater than that currently achieved by the single layer wire grid polarizer.

A further object of the present invention is to achieve the above object by means of a device which may be fabricated by present day micromachining processes and the like.

Another object of the present invention is to achieve the above object by providing a thin film device which will absorb only minimal amounts of the incident radiation so that energy transfer and transmission within an associated optical and/or quasi-optical system will not be degraded.

Yet another object of the present invention is to provide a method and means for achieving improved polarization selectivity over a broad range of radiation wavelengths.

These and other objects are achieved by the present invention which provides a thin film polarizer comprised of a plurality of planar wire grids. Each grid includes a planar array of substantially parallel strips of electrically conductive material supported by a slab of electrically insulative material. The slab is chosen transparent to the bandwidth of incident radiation for maximum efficiency.

Other and further aspects of the present invention will become apparent during the course of the following description and by reference to the accompanying drawings.

BRIEF DESCRIPTION OF THE DRAWINGS

Referring now to the drawings, in which like numerals represent like parts in several views.

DETAILED DESCRIPTION OF THE INVENTION

Figure 1:
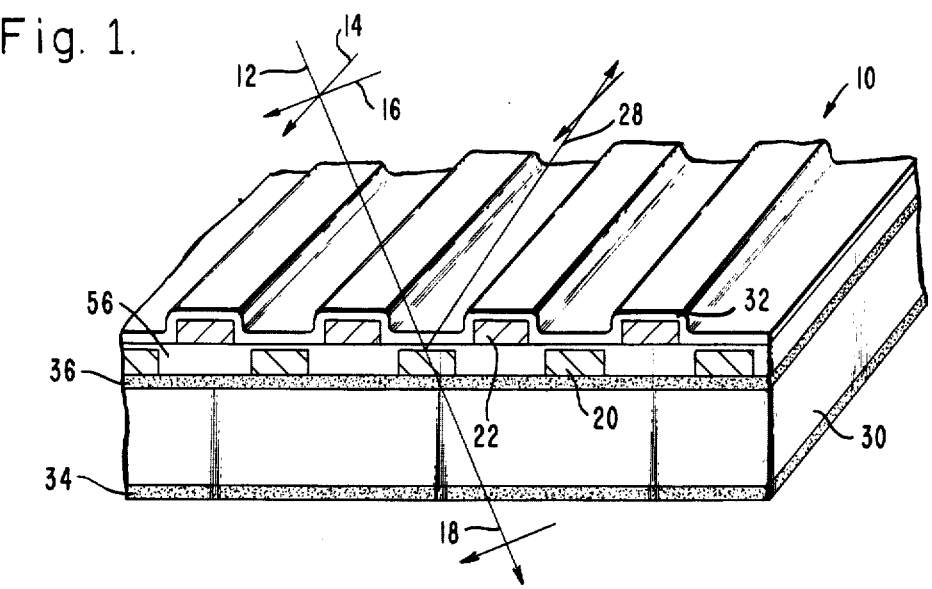
FIG. 1 presents a perspective view of the thin film polarizer of the present invention.

The polarizer 10 of the present invention is shown generally in isometric view in FIG. 1. The polarizer is seen in FIG. 1 to divide an incident beam 12 of unpolarized electromagnetic radiation (i.e., having an associated electromagnetic field with orthogonal components 14, 16) of wavelength into two polarized beams. A beam 18, having electrical field vector transverse to the lengthwise dimension of the metallic grid members, including secondary grid members 22, and primary grid members 20 is transmitted by the polarizer 10. A beam 28 having electric field vector parallel to the length of the grid elements is reflected. The efficiency of the polarizer 10 is measured by the degree to which the beam 28 comprises electromagnetic radiation having electric vector oriented parallel to the length of the grids. A commonly accepted measure of this selectivity is known as the extinction ratio of the polarizer 10.

The polarizer 10 is formed as a monolithic thin film element. The elements of the parallel primary and secondary grids lie upon a primary substrate 30 and within the supplementary substrate layers denoted 32. The substrates 30, 32 function and may be thought of as a unitary element. The division thereof serves as a useful abstraction for purposes of reference to its mode of manufacture, discussed infra. The substrate layers 30,32 serve as both a support for the grid elements and a window with respect to incoming radiation. With regard to the former property, it is essential that they be formed of an electrically insulative material to avoid the shorting of the grid elements. With regard to the latter, optimum performance requires that the substrates be chosen of material invisible to the particular incident radiation. For example, the materials silicon, germanium, zinc selenide and IRTRAN 2, a trademark of the Eastman Kodak Company of Rochester, N.Y., are invisible to infrared radiation in the range of 2–10 microns while a variety of plastics may be employed for infrared radiation in the 30–100 micron range. The slightly greater mass of the multi-grid substrate of the invention, as opposed to that of the single grid polarizer of the prior art additionally enhances its the thermal ruggedness, allowing the device to function well in the presence of a high intensity beam 12.

Figure 2:
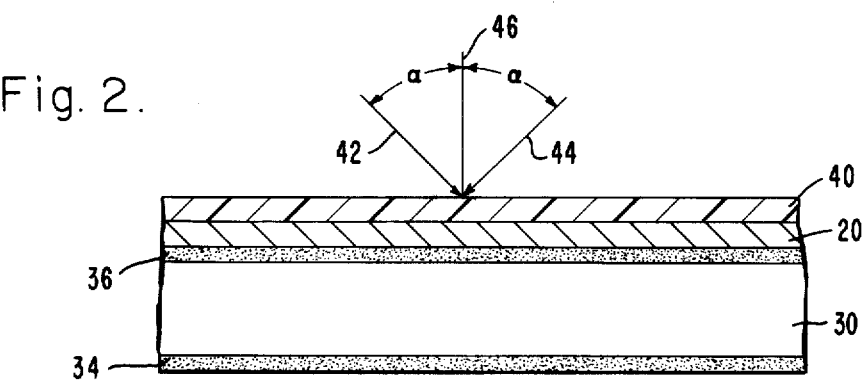
FIG. 2 illustrates, in diagrammatic cross-section view, an initial photoresist step and laser beam exposure in a process for manufacturing the thin film polarizer of the present invention.
Figure 3:
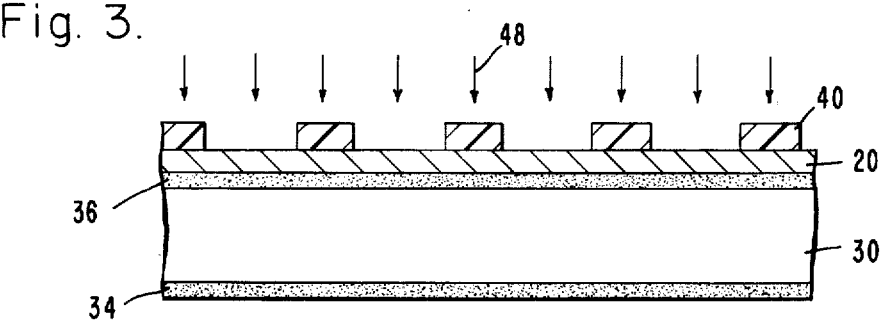
FIG. 3 illustrates the developed photoresist masking pattern on the surface of the structure and the ion beam etching of the exposed portions of the underlying layer of metallization.
Figure 4:
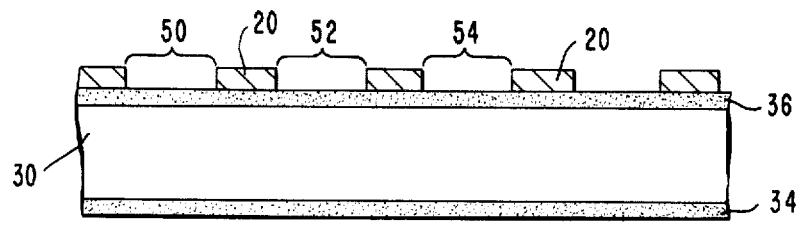
FIG. 4 illustrates the ion beam machined pattern in the metallization layer of FIG. 3 to form the primary grid of the polarizer.

A multi-grid (two grid case) thin film polarizer 10 in accordance with the present invention has been fabricated by a process incorporating principles for fabricating small geometry semi-conductor structures analogous to those disclosed in the above-referenced U.S. Pat. No. 4,049,944 issued to Garvin, Yariv and Somekh. FIGS. 2–4 correspond in general content, although not exactly, to FIGS. 11–14 of the above referenced patent while FIGS. 5–8 indicate the additional steps specifically directed to the provision of the multigrid device.

In FIG. 2 there is shown a primary substrate 30 of suitable material, preferably chosen for invisibility to the wavelength of incident radiation to be polarized. The substrate 30, which may be of any thickness capable of supporting the overlying grid (on the order of a few mils) is coated on both sides with an antireflective coating. An underside coating is indicated by the layer 34 while the topside coating is indicated as layer 36. The coatings 34, 36, each approximately 1 micron thick, serve to prevent reflections of the polarized transmitted beam 18. Such reflections may be occasioned at the dielectric interfaces existing at the interfaces of the primary substrate 30 and the secondary substrate layer 32 and the primary substrate 30 and free space. Appropriate materials for the antireflective coating layers 34, 36 include films of zinc sulphide, magnesium fluoride, and the like.

A layer of metallization 20, approximately 1 micron thick (note that the device is not shown to scale), which will form the elements of the primary grid, is deposited on the primary substrate 30. Materials suitable for the metallization include, inter alia, gold, copper and molybdenum. Other materials, characterized by good conductivity and reflectivity to the operating radiation, will suffice. A photoresist layer 40 is deposited upon the metallization 38 using well known processing techniques. The photoresist layer 40 may be of any of a number of commercially available products. Either a negative resist (such as KMER and KTFR, both commercially available from the Kodak Company of Rochester, N.Y.) or a positive resist (such as those currently available from either Kodak or from the Shipley Corporation of Newton, Mass.) may be advantageously employed.

After the photoresist layer 40 is sufficiently dry, it is exposed to a pair of coherent laser beams 42, 44. Each laser beam is incident the photoresist layer 40 at an angle with respect to a line 46 perpendicular to the photoresist layer 40. The incident laser beams 42, 44 produce optical interference patterns which in turn produce alternate light and dark areas on the surface of the photoresist layers, exposing the layer 40 in a plurality of alternate parallel strips. It can be shown that the period of the developed stripes in the (negative) resist 40 exposures is equal to λ divided by 2 sin α. Assuming a negative resist is employed, the exposed areas will remain when the unexposed portions are removed with a suitable etchant such as xylene which does not react with the chosen antireflective coating 36.

Next, as seen in FIG. 3, the layer of metallization 20 is bombarded with an energetic beam of argon (Ar+) ions 48 after the exposed portions of the resist 40 have been etched away. The ions are of sufficiently high energy to etch the cavities 50, 52, 54 of the metal mask of 38 (as seen in FIG. 4), leaving the primary grid elements 20 therebetween. A single grid fabricated for the polarization of infrared radiation employed widths of the etched out regions on the order of 0.2 to 2.0 microns.

Figure 5:
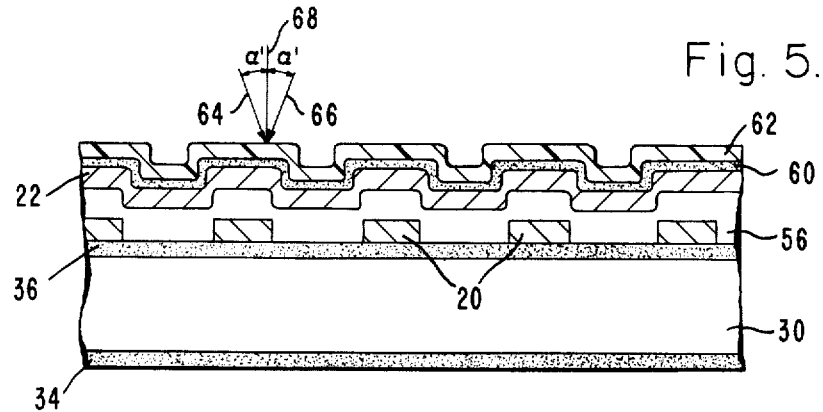
FIG. 5 illustrates, in diagrammatic cross-section view, a second photoresist step and laser beam exposure in the process for manufacturing the invention.

The additional steps employed in the fabrication of the multigrid polarizer 10 are shown for the two grid examples in FIGS. 5-8. In FIG. 5 it can be seen that a new layer 56 of substrate material, on the order of 0.5 microns thick, which will form a portion of the secondary substrate layer 32, has been deposited over the primary substrate 30. A standard means of deposition such as sputtering or evaporation may be used for this purpose. Overlying the layer of substrate material 56 is a second layer of metallization 22 (again, approximately 0.1 micron thick) which will serve to form the secondary grid of the polarizer 10. Above the layer of metallization 22 there is provided a laser anti-reflection coating layer 60. Finally, a layer of photoresist 62 is shown deposited thereon.

Once again the resist 62, when dry, is developed by exposure to a pair of coherent laser beams 64, 66, each incident to the photoresist 62 at an angle $\alpha'$ to the perpendicular 68 drawn thereto. The exposure of the levels above the primary grid is complicated by the uneven surface of the resist layer 62. Such unevenness impairs the ability to obtain an in-phase incidence of the laser beams 64, 66 in the resist 62. However, compensation may be made for this by the provision of the above referenced laser anti-reflective coating layer 60 between the layer of metallization 22 and the photoresist 62. The inclusion of the layer 60 (which is removed with the overlying resist 62) prevents the reflection of exposing laser radiation (usually in the ultraviolet range) and thus eliminates the possible formation of undesired amplitude standing waves in the resist layer 62.

Figure 6:
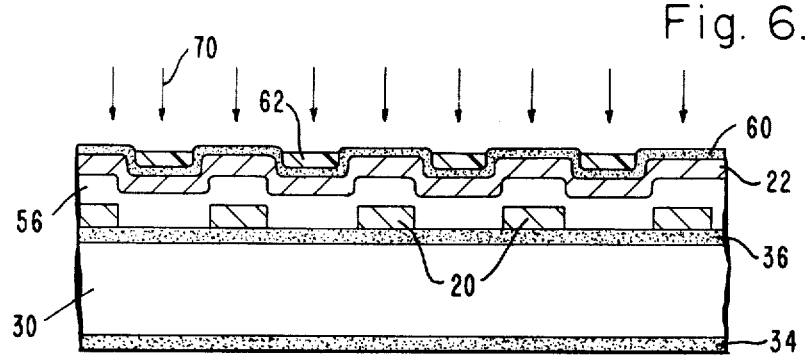
FIG. 6 illustrates the developed photoresist masking pattern on the surface of the structure and the ion beam etching of the exposed portions of the underlying layer of metallization.
Figure 7:
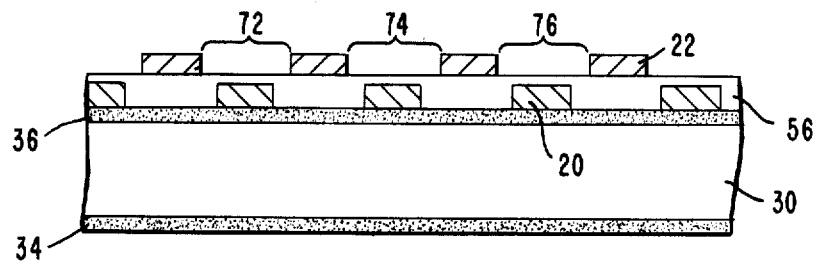
FIG. 7 illustrates the ion beam machined pattern in the metallization layer of FIG. 6 to form the secondary grid of the polarizer.
Figure 8:
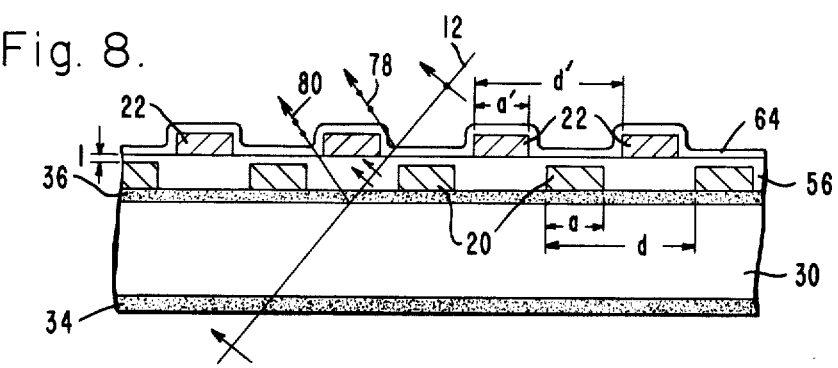
FIG. 8 illustrates the completed thin film polarizer of the present invention after the deposition of a passivating layer of substrate material.

After development of the resist by a proper etchant, the polarizer 10 is once again bombarded by a high energy ion beam 70, as seen in FIG. 6, to machine out the regions 72, 74, 76. The regions which remain therebetween constitute the secondary grid of the polarizer (including the elements 22 as shown in FIG. 7). An additional layer of substrate material deposited atop the secondary grid for additional thermal mass and passivation, as shown in FIG. 8, completes the supplementary substrate layers 32. The process of steps illustrated in FIGS. 5-8 may be repeated to produce any number of additional grids and thus the scope of the present invention is in no wise limited to the two grid example described herein.

The essential dimensions of the polarizer 10 are displayed in cross-section view in FIG. 8. The widths of the grid elements are indicated by the letter a (primary grid) and the letter a' (secondary grid). The period of the grid is indicated as d (primary grid) and as d' (secondary grid). Finally, the spacing between the two planar grids is indicated by the letter l. The theory of the wire grid polarizer is well-known in the art. Basically, a derivation of the mathematical expression for the behavior of the single grid polarizer proceeds from the assumption that the grid at the interface of two media can be represented by a shunt impedance at the junction of two transmission lines. The characteristic impedance of the non-conducting substrate may in turn be represented as $1/n$ times $Z_0$ where $Z_0$ is the impedance of free space and n is the refractive index of the substrate. The equivalent impedance of a grid of high conductivity is reactive. The very complex mathematical relationships disclosing the theory of the wire grid are derived and discussed in a paper by J. P. Auton ["Infrared Transmission Polarizers by Photolithography", *Applied Optics*, V. 6, No. 6 (June 1967)]. Utilizing the relationships therein, one may derive the graph of FIG. 9.

Figure 9:
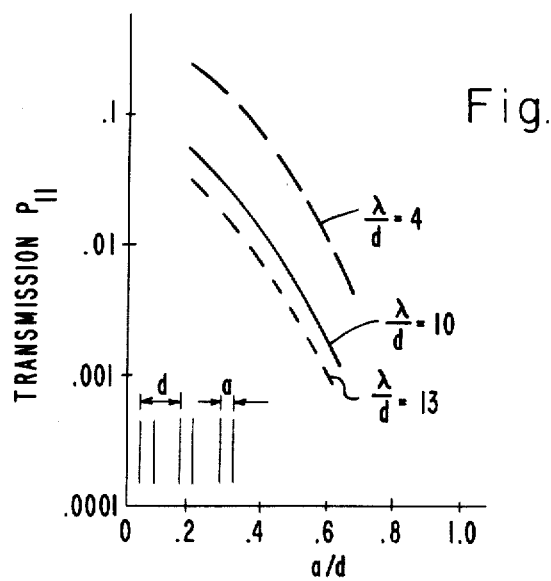
FIG. 9 presents a graph of the polarization characteristic of the wire grid polarizer as a function of the a/d ratio principally to illustrate the problems overcome by the present invention.

FIG. 9 displays the predicted and observed values of transmission of the component of the incident radiation with electric field vector parallel to the lengthwise direction of the elements of a grid as a function of both the radiation wavelength-to-grid period ratio ($\lambda/d$) and the ratio of the element width-to-period (a/d). From FIG. 9 it can be seen that the observed values do in fact correspond to Auton's prediction. A lesser amount of the component parallel to the grid elements is transmitted (and, hence, a greater amount is reflected) as the a/d ratio is increased. Additionally, a curve-to-curve comparison shows that the transmission is decreased, and hence reflection increased, as the ratio of the wavelength-to-grid period is increased. As mentioned supra, this analysis has led to the design of wire grid polarizers having an extinction ratio of up to 500-to-one by close element spacings which maximize the above-disclosed ratios. However, the observed theoretical dependence of the polarizer on a/d and $\lambda/d$ acts as a limit to the possibility of increasing the efficiency of the wire grid polarizer barring significant advances in methods of manufacture. The dependence of the transmission on $\lambda/d$ and on a/d indicates that improved performance only be achieved (with the single grid polarizer) through the continual decrease of d, the grid period. The above stated extinction ratio of 500-to-one represents a practical limitation to the achievable selectivity of a grid fabricated according to known manufacturing processes. The multilayer grid, however, achieves significantly higher extinction ratios for given values of $\lambda/d$, $\lambda/d'$, a/d and a'/d' by virtue of the fact that the overall extinction ratio of the multi-layer polarizer 10 is the product of the individual extinction ratios of the separate wire grid layers. Thus, for the thin film polarizer 10 of FIG. 9, the extinction ratio is the product of the extinction ratio of the primary grid (a function of $\lambda/d$ and a/d and the extinction ratio of the secondary grid (a function of $\lambda/d'$, and a'/d'.

The enhanced selectivity of the multi-grid device rests upon the realization that two (or more) separate polarization processes occur with the passage of radiation through the multi-grid polarizer 10. From FIG. 8 it can be observed that the incident unpolarized beam 12, upon encountering the secondary grid members 22, is split into a reflected beam 78 and a transmitted beam indicated by dashed line. The reflected beam 78 contains essentially all of the component of the incident beam 12 having electric field vector parallel to the direction of the grid elements 22. Departures from one hundred percent reflection of parallel field vector and transmission of perpendicular field vector indicate the finiteness of the extinction ratio obtainable from a single wire grid.

The dashed transmitted beam, upon encountering the primary grid members 20, is polarized in a likewise manner to that just described. The dashed beam appears to the primary grid members 20 as the beam 12 appeared to the secondary grid members 22. The inter-grid spacing, l, is maintained at less than one wavelength to avoid the occurrence of inter-grid resonance (known as the Etalon effect) which might otherwise complicate the secondary reflection of a ray 80 containing a high proportion of the energy of the (dashed) ray with electric field vector parallel to the lengths of the elements of the primary grid members 20. Thus multiple polarization may be achieved by the polarizer 10 in comparison to the single grid polarizer of the prior art. Typically a double layer polarizer, with each grid providing an extinction ratio of 500:1 will realize an overall extinction ratio of 250,000:1. Clearly, the preceding analysis may be extended to multi-grid polarizers having more than two component grids to derive a generally multiplicative effect.

Thus, it is seen that there has been brought to the art of energy polarization a new thin film element capable of achieving significantly increased efficiency. The element, being a thin film device, is of high efficiency, absorbing a minimum of incident radiation. Also, due to its thin film nature, this device may be used in conjunction with systems for optical infrared and other energies without interrupting the transmissions therein and thus requiring compensating elements to correct aberrations introduced by its very presence. The use of substrate material as an overcoating for the device provides an insulating, transparent medium which effects passivation and adds thermal mass to the grid pattern, thus enabling the structure to handle greater radiation flux without damage.

This invention, having been described in its preferred embodiment, is clearly susceptible to numerous modifications and embodiments within the exercise of the inventive faculty. Accordingly, the scope of this invention is defined by the scope of the following claims.

What is claimed is:

1. A method for making a thin film polarizer on a substrate surface comprising:

placing a first metal layer on said surface;

first photolithographically forming a grid in said first metal layer defined by the interference pattern of at least two coherent beams;

placing an insulating layer over said first metal layer;

placing a second metal layer over said insulating layer;

placing an anti-reflective coating over said second layer;

placing a photoresistive layer over said anti-reflective coating; and second photolithographically forming a grid in said second metal layer defined by the interference pattern of at least two coherent beams, wherein said anti-reflective coating substantially prevents formation of standing waves within said photoresistive layer during said second photolithographic forming step.

2. The method of claim 1 wherein said antireflective layer is removed after said second photolithographically forming step.

3. The method of claim 1 wherein said second forming step comprises forming a grid in said second metal layer which is sufficiently nearly parallel to said grid in said first metal layer formed during said first forming step so that the extinction ratio across the two grids is proportional to the product of their individual extinction ratios.

4. The method of claim 1 wherein said first and second photolithographic forming steps comprise forming said grids so as to have a grid spacing less the the wave length λ of incident radiation to be polarized, said forming steps further comprising forming said grids so that they are sufficiently nearly parallel to one another so that the extinction ratio across the two grids is proportional to the product of their individual extinction ratios.

* * * * *